United States Patent
Vineyard et al.

[11] Patent Number: 5,938,517
[45] Date of Patent: Aug. 17, 1999

[54] NECK LOCATING STRUCTURE FOR POULTRY PROCESSING APPARATUS

[75] Inventors: Mark D. Vineyard, Freistatt, Mo.; Rudolf J. Tieleman, Kansas City, Kans.; Frank J. Criscone, II, Gladstone, Mo.

[73] Assignee: Johnson Food Equipment, Inc., Kansas City, Kans.

[21] Appl. No.: 08/970,256

[22] Filed: Nov. 14, 1997

[51] Int. Cl.⁶ ........................................ A22C 21/06
[52] U.S. Cl. ........................ 452/63; 452/120; 452/54
[58] Field of Search .................... 452/63, 120, 163, 452/168, 117, 118, 54

[56] References Cited

U.S. PATENT DOCUMENTS

| | | | |
|---|---|---|---|
| 3,879,803 | 4/1975 | Verbakel . | |
| 3,886,635 | 6/1975 | Meyn | 452/117 |
| 3,983,601 | 10/1976 | Verbakel | 452/118 |
| 4,019,222 | 4/1977 | Scheier et al. . | |
| 4,184,230 | 1/1980 | Fox et al. | 452/168 |
| 4,249,285 | 2/1981 | Sheehan et al. | 452/63 |
| 4,262,387 | 4/1981 | Scheier et al. | 452/117 |
| 4,265,001 | 5/1981 | Hathorn et al. | 452/120 |
| 4,894,885 | 1/1990 | Markert | 452/63 |
| 4,918,787 | 4/1990 | Hazenbroek | 452/168 |
| 5,569,072 | 10/1996 | Tieleman et al. | 452/117 |

*Primary Examiner*—Willis Little
*Attorney, Agent, or Firm*—Hovey, Williams, Timmons & Collins

[57] ABSTRACT

The holding fixture has a narrow neck fork designed to fit entirely inside of and between the shoulder joints of the carcass so as to utilize the inside surfaces of the shoulder joints as a means of centering the carcass and precluding side-to-side movement thereof. Each arm of the fork is narrow enough to fit entirely between the neck and the corresponding shoulder joint. A modified fixture for use with a crop-inclusive eviscerator has a resilient projection on the backrest between the arms of the fork to yieldably push the backbone at the base of the neck out away from the backrest to facilitate snagging of the esophagus by a hook-shaped dislodging tool utilized as part of the eviscerator.

27 Claims, 4 Drawing Sheets

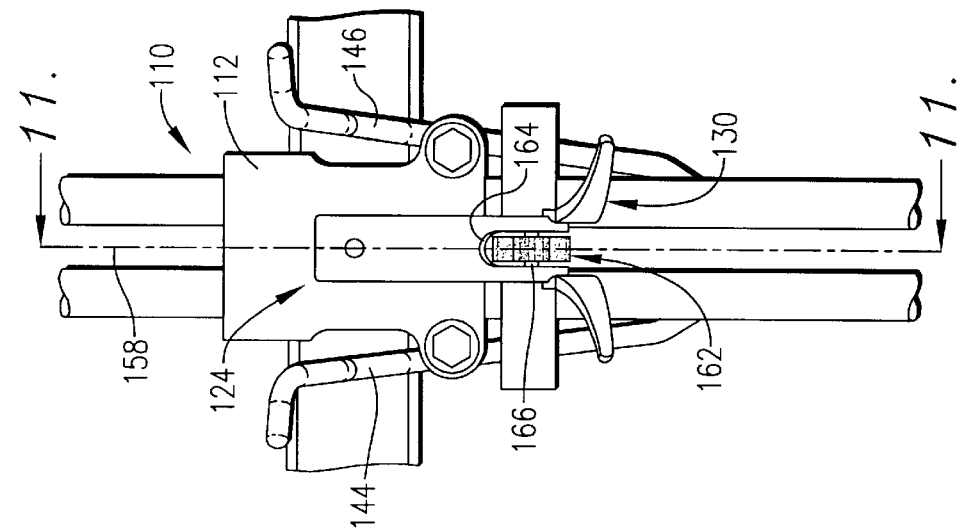
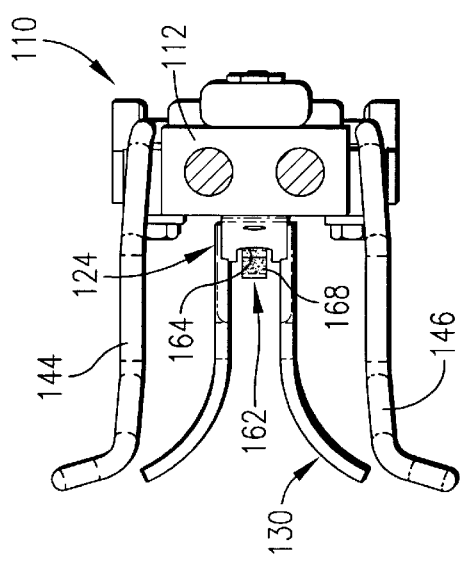
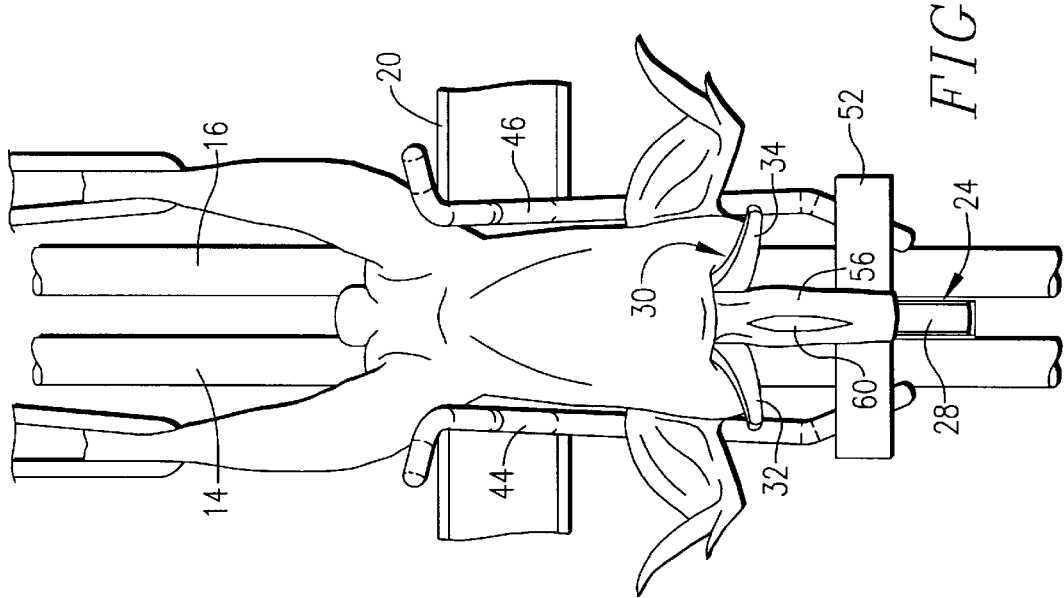

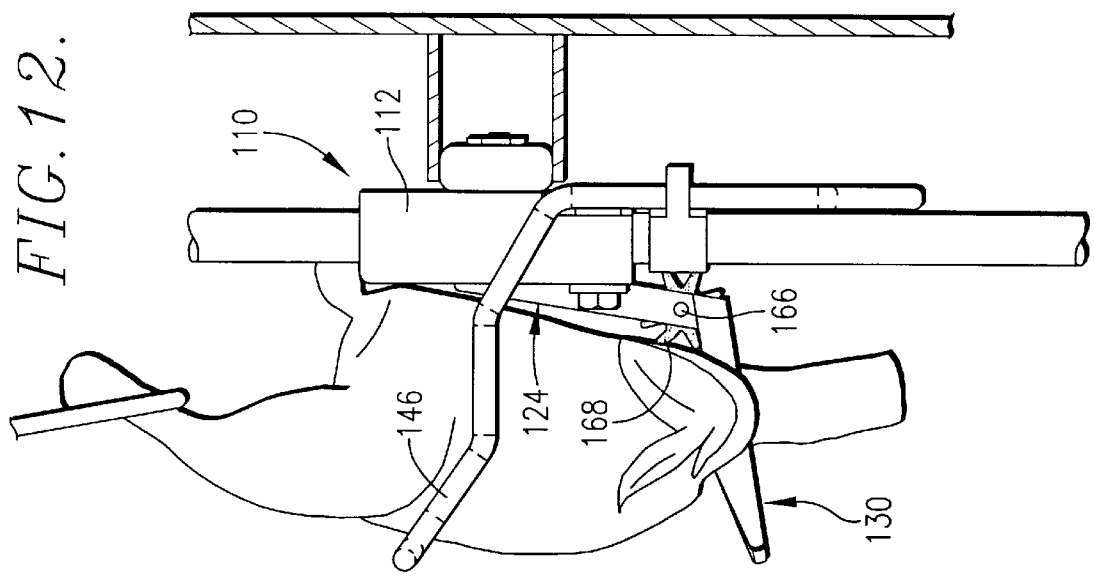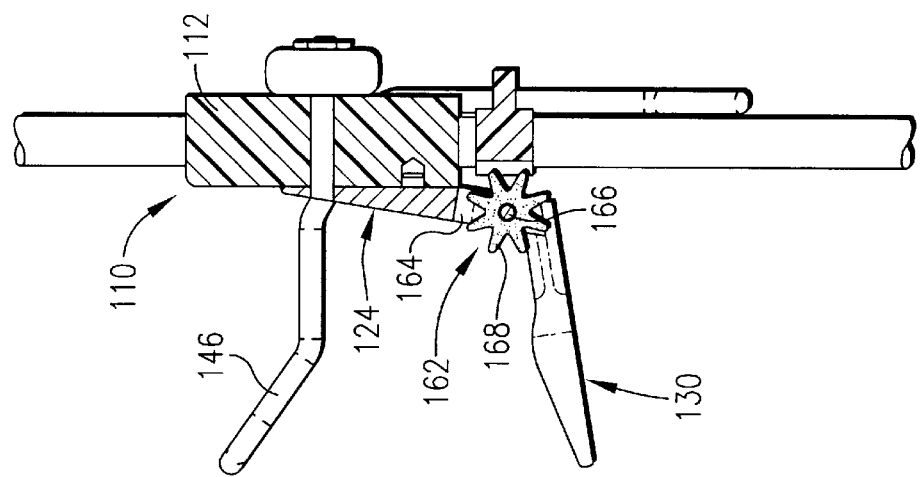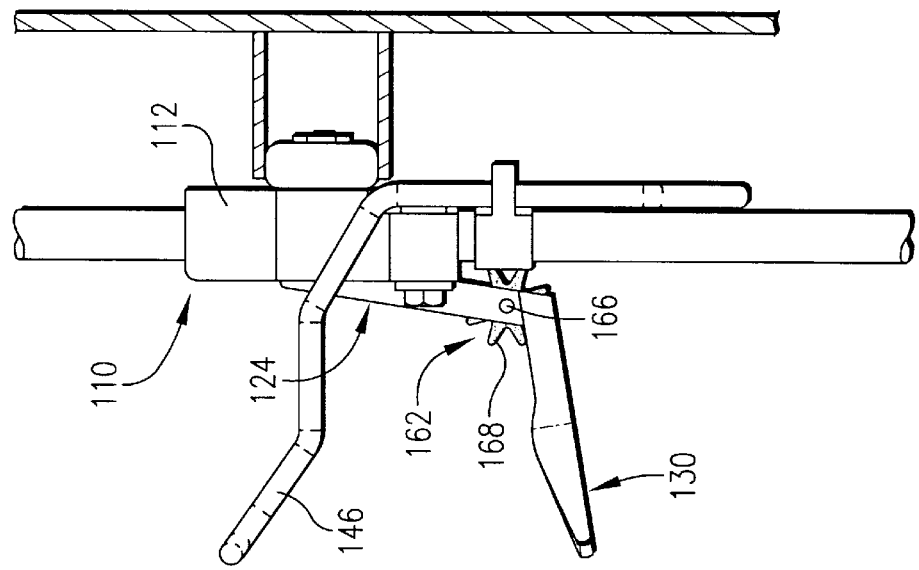

NECK LOCATING STRUCTURE FOR POULTRY PROCESSING APPARATUS

BACKGROUND

Application Ser. No. 08/816,490 filed Mar. 13, 1997, now U.S. Pat. No. 5,707,280 as a continuation of Ser. No. 08/589,114 filed Jan. 19, 1996, now abandoned discloses crop inclusive eviscerating method and apparatus in which the crop is loosened from its point of attachment to the neck cavity of the carcass before the crop is then removed from the carcass intact and still connected to the rest of the entrails when the entire bundle of entrails is withdrawn from the carcass. In carrying out this procedure, a hook-shaped dislodging tool enters a small access slit which has been prepared in the neck skin of the carcass. The tool captures the esophagus within the eyelet of its hook and then exerts a downward pulling force to pull the eyelet down around and past the crop, effectively disengaging the crop from the membranes that would otherwise hold it in place. Then, a removal tool enters the main body cavity from the opposite end of the carcass to capture the stomach and other organs within the interior loop of the tool. When the loop is withdrawn to extract the entrails, the loosened crop is pulled along with the other entrails by the unbroken esophagus that interconnects the stomach and the crop.

Accurately and precisely making the longitudinal access slit in the neck skin is very important. If the blade used in making the slit accidentally severs the esophagus, contaminants may be released into the meat and, moreover, the esophagus may be weakened to such an extent that it is unable to pull the crop from the neck area without breaking during the eviscerating step. Moreover, there is considerable bony structure within the neck itself and it is important that the knife blade avoids such structure as it pierces the skin and moves through its slitting stroke.

Pending application Ser. No. 08/792,928, filed Jan. 21, 1997 discloses a method and apparatus for preparing such an access slit in the neck skin. The fixture that holds the carcass during the slitting operation is provided with a neck fork that receives the neck to help locate the trunk of the carcass and the neck for the slitting stroke. However, the fork disclosed in this application is relatively wide, having arms that are spaced apart by a relatively large amount so that the neck is only loosely confined between the arms. Moreover, the wide spacing of the arms causes them to engage the carcass at the shoulder joints so that the contoured surfaces of the joints ride on the arms of the fork. Rather than securely centering the trunk of the carcass and the neck area, this tends to allow the carcass to move sideways as the shoulder joints roll on the fork arms, which permits the trunk and neck areas to move out of centered positions. The wide neck fork disclosed in the '928 application is also used on the cropper/eviscerator disclosed in the '490 application. It has been found that the wide neck fork in that machine sometimes allows the carcass to become off-center to such an extent that the hook of the crop dislodging tool has a difficult time snagging or picking up the esophagus at the point where it crosses the backbone of the carcass. Using only the neck through its engagement with the fork to center the lower end of the carcass has been found to allow the carcass to sometimes deviate from its centered position, which in turn makes it difficult for the dislodging hook to snag the esophagus.

One source of the problem in this respect is believed to come from the fact that the poultry carcasses are not consistently the same size. It has been found in particular that the dimensions at the base of the neck are subject to considerable variation between birds of different sizes. To accommodate such dimensional variances, the neck fork was made wide enough to receive the largest bird, but in the process that accommodation also built in room for error when smaller sized birds were being processed.

TECHNICAL FIELD

This invention relates to improvements in a holding fixture used in high-speed, automated poultry processing systems in which processing operations are performed on poultry carcasses while the carcasses are moving along a conveying line. More particularly, the invention relates to improved ways of centering, holding, and positioning the neck and shoulder area of a carcass on a processing fixture to facilitate operations such as cutting a longitudinal access slit in the skin of the neck and subsequently withdrawing all of the viscera, including the crop, from the carcass.

SUMMARY OF THE INVENTION

It has been found that, within the range of bird sizes typically being processed with this type of automated equipment, the distance between the shoulder joints of the birds tends to vary less than the distance across the base of the neck. Thus, the present invention achieves centering and secure holding of the lower trunk area of the carcass utilizing the shoulder joints of the carcass more than the neck of the carcass. In this respect, the present invention contemplates using a relatively narrow neck fork whose outer or outside width dimension is always less than the distance between the shoulder joints of the poultry carcasses to be processed such that the arms of the fork become disposed inside of the shoulder joints and bear outwardly against the joints when the carcass is in its final position on the fixture. This laterally outward pressure from the fork arms against the inside edges of the shoulder joints keeps the lower region of the trunk centered and stable, which in turn centers the neck for the slitting tool. Each arm of the fork is itself relatively narrow so as to fit snugly and securely into the space on each carcass between the base of the neck and the corresponding shoulder joint. During a slight lifting action by the neck fork against the carcass, the fork arms depress the muscle tissues between the neck and the shoulder joints so as to become firmly located with respect to the carcass.

The present invention also relates to the use of a special projection on the holding fixture at the base of the back of the neck that causes the backbone in that area to be presented somewhat more prominently to the dislodging hook inside the neck cavity during the eviscerating procedure. This permits the hook to scrape more positively against the backbone at the base of the neck so as to more assuredly snag the esophagus at the point where it crosses the backbone, thus increasing the chances that the crop will be adequately dislodged from the neck tissues as to permit removal during the viscera withdrawing stroke that follows. Preferably, the projection is a resilient projection to allow yieldable relief when carcasses of larger sizes are being processed, such birds having increased dimensions in the area of the base of the neck that would otherwise cause the dislodging hook to scrape against the backbone with excessive pressure. Having the projection resilient allows the scraping pressure to remain substantially constant, regardless of the dimensional variations that may be encountered between carcasses. Furthermore, in its preferred form, the projection is in the nature of a freely rotatable, toothed wheel in which each tooth is bendable and resilient.

BRIEF DESCRIPTION OF THE DRAWINGS

FIG. 5 is a fragmentary front elevational view of the apparatus similar to FIG. 1 but showing a poultry carcass held in place on the fixture with the stabilizing arms clamped against the trunk of the carcass and the neck fork lifted up into its centering position;

FIG. 8 is a fragmentary front elevational view of a poultry holding fixture incorporating the narrow neck fork concepts of FIGS. 1–7 but also incorporating the resilient back pressing concepts of the present invention so that the fixture of FIG. 8 is especially adapted for use in a cropper/eviscerator of the type disclosed and claimed in the '490 application;

FIG. 9 is a left side elevational view thereof;

FIG. 10 is a top plan view thereof;

FIG. 11 is a fragmentary, vertical cross-sectional view of the fixture taken substantially along line 11—11 of FIG. 8; and FIG. 12 is a fragmentary left side elevational view of the apparatus similar to FIG. 9 but illustrating the manner of use of the invention in which the lower trunk area of the carcass in the vicinity of the base of the neck is yieldably pushed outwardly by the resilient projection.

DETAILED DESCRIPTION

Slitter Locating Structure

Figure 1:
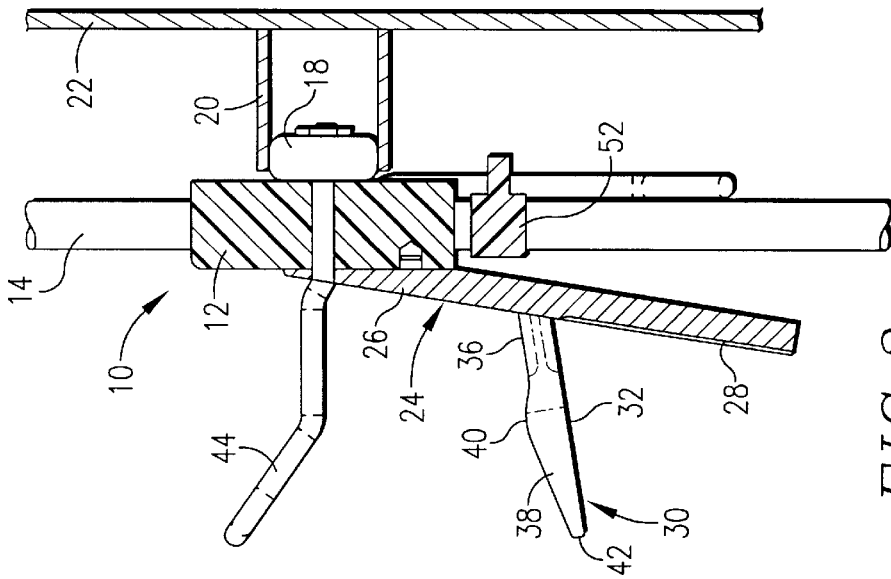
FIG. 1 is a fragmentary front elevational view of a poultry carcass holding fixture constructed in accordance with the principles of the present invention and forming a part of a piece of poultry processing equipment.

The fixture 10 of FIGS. 1–7 is especially suited for use as part of the neck-slitting equipment disclosed and claimed in the '928 application referred to above. The '928 application is hereby incorporated by reference into the present application. Fixture 10 includes a block 12 and a pair of upright, tubular guides 14 and 16 that slidably support the block 12. A guide roller 18 projecting from the backside of the block 12 is received within a stationary cam track 20 on a fixed plate 22 of the processing machine to cause the block 12 to move up and down along the guides 14,16 as the fixture 10 moves relative to the plate 22 in a generally horizontal direction. It will be appreciated that the fixture 10 and the plate 22 form parts of a larger machine in which a series of the fixtures are continuously moving along a prescribed path of travel, such as a circle, to intersect with and engage a series of shackled poultry carcasses moving along an overhead conveying line.

Figure 6:
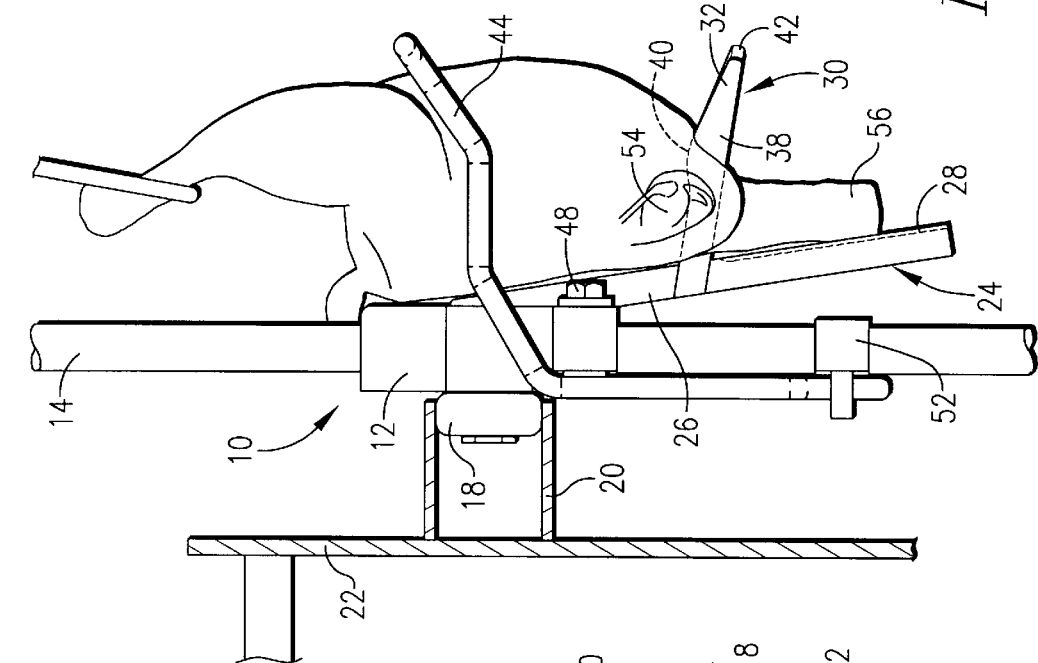
FIG. 6 is a right side elevational view of the apparatus and carcass in the FIG. 5 condition.

The fixture 10 further includes a backrest 24 secured to the block 12 and projecting downwardly and slightly outwardly therefrom. The backrest 24 is in the nature of an elongated, generally rectangular in cross-section bar 26 that is fixed to the block 12 adjacent its upper end and is unsupported at its lower, outer end. The bar 26 has a flat smooth outer surface along its upper half and is provided with an elongated, longitudinally extending depression 28 along its lower half As illustrated in FIG. 6, the back and neck of the carcass are disposed to lie up against the backrest 24 during use, with the neck being positioned to fit into the depression 28 that is somewhat complementally shaped with respect to the neck.

The fixture 10 additionally includes a narrow neck fork 30 that is rigidly affixed to the backrest 24 at substantially the mid-point thereof and which projects downwardly and forwardly outwardly therefrom. The neck fork 30 includes a pair of left and right, laterally spaced apart arms 32 and 34 which define a mouth or receiving space 36 therebetween for the neck.

Figure 4:
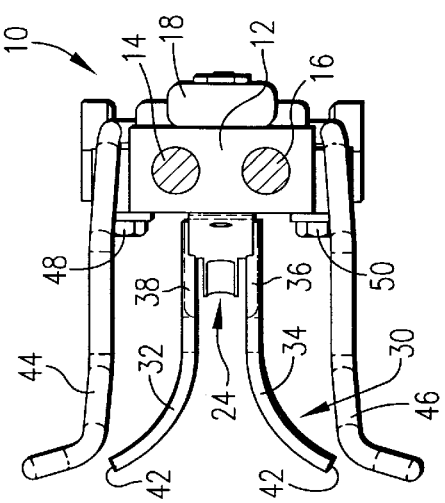
FIG. 4 is a top plan view thereof.

The arms 32 and 34 are mirror images of one another. Each includes a flat, straight inner section 36 closest to the backrest 24 that projects straight out from the backrest 24 as seen most clearly in FIG. 4. Adjacent the mid-point of each arm 32,34, the straight section 36 blends into an out turned, arcuate outer section 38 so that, when viewed in top plan as shown in FIG. 4, the fork 30 has a flared entrance to the receiving space 36 to facilitate ingress and egress of the neck of the carcass.

Figure 7:
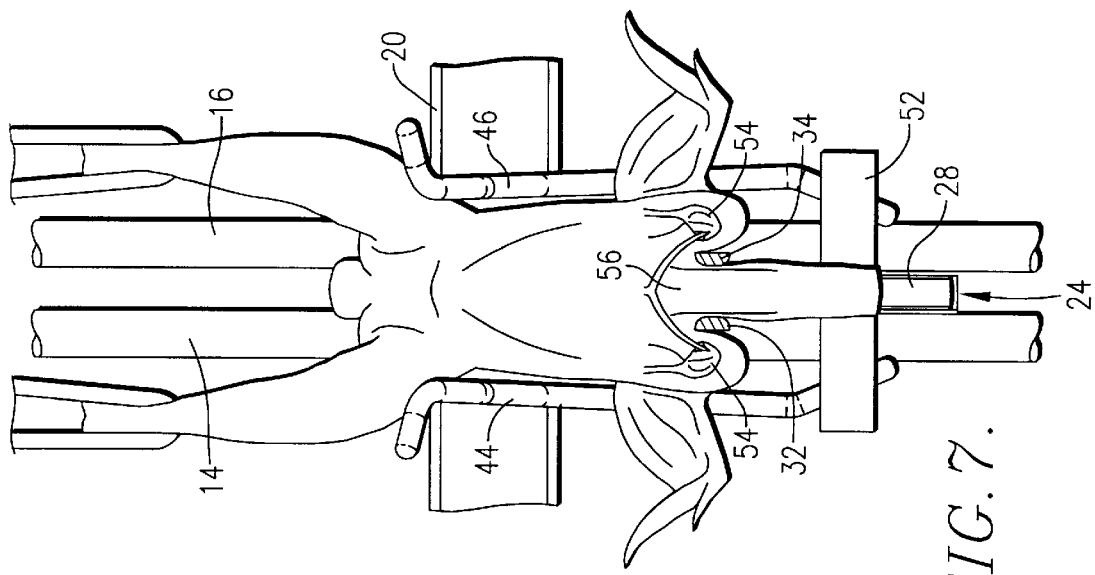
FIG. 7 is a fragmentary front elevational view of the apparatus and carcass similar to FIG. 5 but having parts of the fork and carcass broken away to reveal the manner in which the narrow arms of the fork become pressed up into the space between the shoulder joints and the base of the neck.

As seen from the cross-sectional illustration in FIG. 7, each of the arms 32,34 is relatively thin. Preferably, the thickness or width of each arm does not exceed six millimeters. Moreover, in the preferred embodiment, each arm 32,34 is generally semi-circular shaped, with the arcuate surface being disposed to the inside and the flat surface disposed to the outside.

Also in the preferred embodiment, the spacing between the inner sections 36 of the arms 32,34 is no less than twenty millimeters. The distance between the outside surfaces of the inner sections 36, i.e., the overall width of the fork 30 in the area where it receives the neck, is no greater than forty millimeters. A preferred dimension for the inside spacing of the arms is twenty-four millimeters, while the preferred dimension between the outside surfaces of the arms is thirty-six millimeters.

Figure 2:
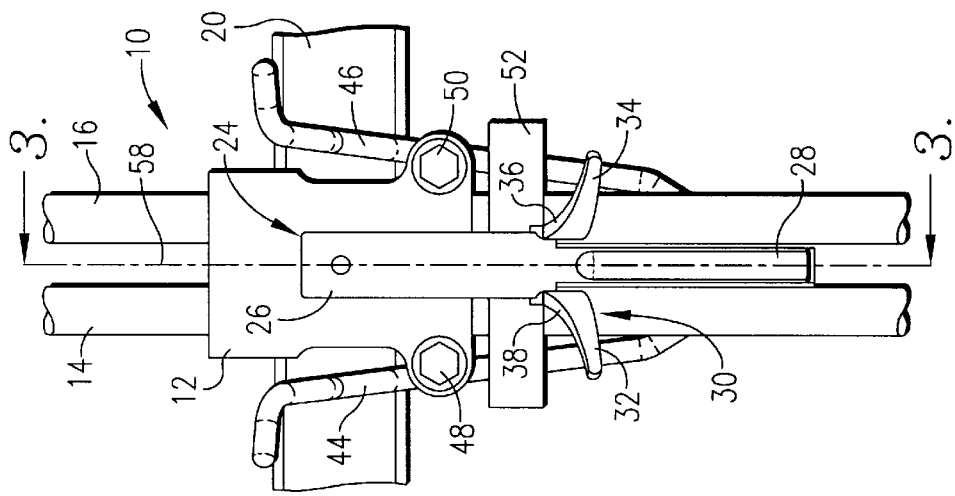
FIG. 2 is a fragmentary left side elevational view thereof.
Figure 3:
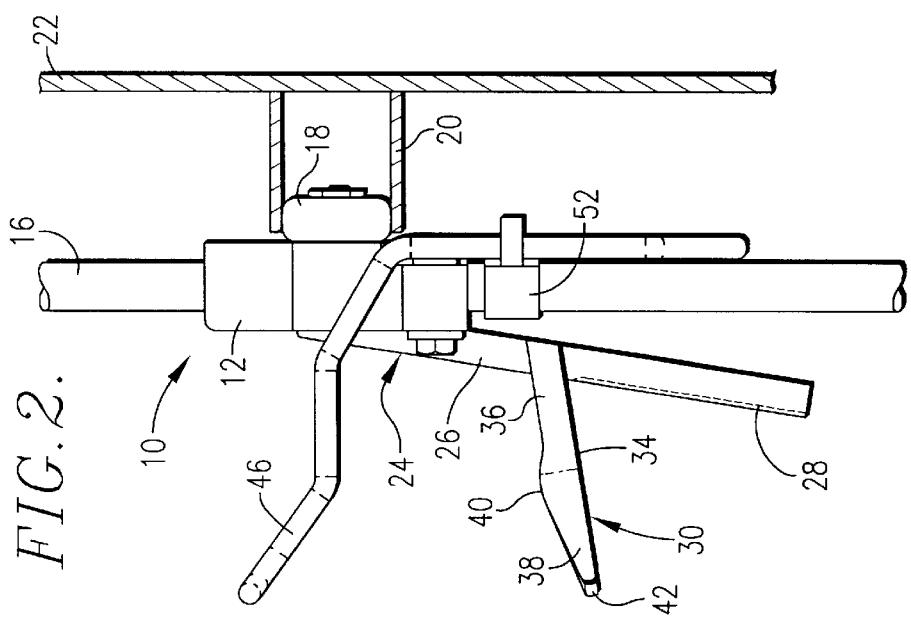
FIG. 3 is a fragmentary vertical cross-sectional view thereof taken substantially along line 3—3 of FIG. 1.

As illustrated in FIGS. 2 and 3 in particular, the fork 30 is angled somewhat downwardly and outwardly. To facilitate retention of the carcass up against the backrest 24 during use, each of the arms 32,34 is provided with a slight hump 40 on the upper edge of the arm at the approximate mid-point thereof. The hump 40 begins at the straight section 36 and finishes on the curve, outer section 38. As seen particularly in FIGS. 2 and 3, each of the arms 32,34 tapers to a rounded point 42 at the outermost end of its curved section 38.

The fixture 10 also includes stabilizing mechanism in the form of a pair of stabilizer arms 44 and 46. Such stabilizing mechanism preferably takes the form of that disclosed and claimed in U.S. Pat. No. 5,569,072 issued Oct. 29, 1996. The '072 patent is hereby incorporated by reference into the present specification for a full and complete understanding of the nature and operation of the stabilizer arms 44 and 46. Suffice it to point out that the arms 42,46 are pivotally carried by the block 12 for inward and outward swinging movement about pivots 48 and 50 under the control of a cam block 52 fixed to the upright guides 14 and 16. As the block 12 moves up and down on the guides 14,16, the cam block 52 causes the stabilizer arms 44,46 to operate.

When a carcass is placed on the fixture 10 as illustrated in FIGS. 5, 6 and 7, the trunk of the carcass becomes clamped between the stabilizer arms 44,46 while the neck is received within the neck fork 30. The block 12 moves upwardly along the guide rods 14,16 relative to the position illustrated in FIG. 1 which not only causes the stabilizer arms 44 to securely grip the carcass, but also causes the fork arms 32 and 34 to press up into the loose skin and tissue at the base of the neck, between the shoulder joints 54 and the neck 56 as illustrated in FIG. 7. See also FIGS. 5 and 6. With the fork arms 32,34 thusly positioned, the arms 32,34 tend to bear outwardly against the shoulder joints 54, precluding side-to-side shifting of the carcass.

The backrest 24, the neck fork 30, and the stabilizer arms 44,46 are all centered and symmetrical with respect to a center line 58 extending down the length of the fixture 10 as illustrated in FIG. 1. Consequently, when the carcass is held on the backrest 24 by the stabilizer arms 44,46 and the neck fork 30 as illustrated in FIGS. 5–7, the carcass is centered. This includes not only the main trunk portion of the carcass, but also the neck 56 such that, as illustrated in FIG. 5, a longitudinal slit 60 can be prepared in the neck skin slightly to one side of center by mechanism disclosed and claimed in the '928 application.

Cropper/Eviscerator Locating Structure

The fixture 110 of FIGS. 8–12 is especially suited for use in a cropper/eviscerator machine as disclosed and claimed in the '490 application. The fixture 110 is closely similar to the fixture 10, having the same mounting block 112, narrow neck fork 130, and stabilizer arms 144 and 146. However, unlike the backrest 24, the backrest 124 terminates at the neck fork 130 and does not have a lower neck-receiving portion. Moreover, the fixture 110 includes a special projection 162 at the lower end of the backrest 124 that helps to best position the lower trunk portion of the carcass for snagging of the esophagus by the dislodging tool during the evisceration process.

Unlike the backrest 24, the backrest 124 is vertically slotted at its lower end, presenting a slot 164. Preferably, the projection 162 is not only resilient but is in the form of a freely rotatable wheel. Thus, the slot 164 provides a means of attaching the projection wheel 162 to the backrest 124 via a pivot pin or spindle 166 for the wheel 162 that spans the slot 164. The wheel 162 is preferably constructed of a soft rubber material such as polyurethane having a durometer value of 32/38A. A series of bendable, resilient teeth 168 are spaced circumferentially about the periphery wheel 162 to serve as the portion of the wheel actually making physical contact with the back of the poultry carcass. As will be noted in FIGS. 9, 11 and 12, while most of the wheel 162 is housed within the slot 164, the front portion of the wheel 162 projects outwardly from and beyond the backrest 124 toward the carcass. The wheel 162 is located on the center line 158 of the fixture 110 as illustrated in FIG. 8.

In use, the fixture 110 functions substantially the same as fixture 10, except that the resilient projection 162 engages the back of the carcass at the base of the neck and pushes it out away from the backrest as illustrated in FIG. 12. The neck fork 130 settles into the soft tissue between the base of the neck and the shoulder joints of the carcass in the same manner illustrated in FIG. 7 with respect to fixture 10 such that the carcass is well-centered on the fixture 110 and well-secured in place. When the dislodging hook of cropper/eviscerator mechanism of the type illustrated in the '490 application enters the slit 60 (FIG. 5) of the poultry carcass, the esophagus in the area of the resilient wheel 162 will be presented prominently to the dislodging hook to increase the likelihood that the hook will snag the esophagus as intended. As the hook is dragged along the backbone at the base of the neck to snag the esophagus, the resiliency of the teeth 168 allows the carcass to be yieldably pushed in closer to the backrest 124 as may be needed to accommodate thicker back dimensions on larger birds. Thus, the pressure exerted by the hook against the backbone can be maintained essentially constant, regardless of the size of the birds being processed.

There are of course times when the eviscerating machine is operating without poultry carcasses being present. In those instances, the viscera withdrawing tool moves down to a point adjacent the lower end of the backrest 124, and then withdraws upwardly. By having the resilient projection 162 in the nature of a freely rotatable wheel, the removal tool can drag across the projection 162 without causing damage. Instead of being scraped by the tool, the wheel simply turns to the extent necessary to accommodate the moving tool.

Although preferred forms of the invention have been described above, it is to be recognized that such disclosure is by way of illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and assess the reasonably fair scope of their invention as pertains to any apparatus not materially departing from but outside the literal scope of the invention as set out in the following claims.

We claim:

1. In a fixture for holding a poultry carcass in place during processing operations, the improvement comprising:

a backrest for the carcass while the carcass is held in an inverted position by the fixture, said backrest including a neck-receiving portion so disposed that the neck of the carcass lies up against the neck-receiving portion when the carcass is held by the fixture;

releasable gripping mechanism for holding the trunk of the carcass generally immobilized in a centered position with respect to a generally upright center line while the carcass a narrow fork below said gripping mechanism disposed to receive and locate the neck of the inverted carcass in a centered position while the trunk of the carcass is gripped by said mechanism, said narrow fork including a pair of closely laterally spaced apart, outwardly projecting arms disposed symmetrically with respect to said center line and positioned to engage the carcass on opposite sides of the neck at the base thereof inside of its shoulders.

2. In a fixture as claimed in claim 1, said backrest extending downwardly and slightly outwardly with respect to a vertical plane.

3. In a fixture as claimed in claim 1, said backrest comprising an elongated, relatively narrow bar having a width that generally corresponds to the spacing between said arms of the fork.

4. In a fixture as claimed in claim 3, said fork being located between a pair of upper and lower ends of the bar, said bar having a longitudinal depression extending upwardly from the lower end of the bar for complementally receiving the neck.

5. In a fixture as claimed in claim 4, each arm of the fork having a cross-sectional thickness that is small enough to allow the arm to be entirely disposed between one side of the neck and the corresponding shoulder of the carcass.

6. In a fixture as claimed in claim 5, each arm of the fork having a thickness that does not exceed approximately six millimeters.

7. In a fixture as claimed in claim 6, the spacing between the arms of the fork being no less than twenty millimeters and the overall width of the fork adjacent the backrest being no greater than forty millimeters.

8. In a fixture as claimed in claim 7, the spacing between the arms of the fork being approximately twenty-four millimeters, the overall width of the fork adjacent the backrest being approximately thirty-six millimeters.

9. In a fixture as claimed in claim 8, each of said arms having an upper edge extending outwardly from the backrest to the outer extremity of the arm, each of said upper edges having a hump approximately midway between the backrest and the outer extremity to assist in confining the carcass during processing.

10. In a fixture as claimed in claim 1, each arm of the fork having a cross-sectional thickness that is small enough to allow the arm to be entirely disposed between one side of the neck and the corresponding shoulder of the carcass.

11. In a fixture as claimed in claim 10, each arm of the fork having a thickness that does not exceed approximately six millimeters.

12. In a fixture as claimed in claim 11, the spacing between the arms of the fork being no less than twenty millimeters.

13. In a fixture as claimed in claim 12, the spacing between the arms of the fork being approximately twenty-four millimeters, the overall width of the fork adjacent the backrest being approximately thirty-six millimeters.

14. In a fixture as claimed in claim 1, the spacing between the arms of the fork being no less than twenty millimeters and the overall width of the fork adjacent the backrest being no greater than forty millimeters.

15. In a fixture as claimed in claim 14, the spacing between the arms of the fork being approximately twenty-four millimeters.

16. In a fixture as claimed in claim 15, the overall width of the fork adjacent the backrest being approximately thirty-six millimeters.

17. In a fixture for holding a poultry carcass in place during processing operations, the improvement comprising:

a backrest for the carcass while the carcass is held in an inverted position by the fixture;

releasable gripping mechanism for holding the trunk of the carcass generally immobilized in a centered position with respect to a generally upright center line while the carcass is on the fixture;

a fork below said gripping mechanism disposed to receive and locate the neck of the inverted carcass in a centered position while the trunk of the carcass is gripped by said mechanism; and a projection associated with the backrest in the vicinity of said fork in position for engaging and positioning the shoulder area of the carcass outwardly away from the backrest during processing operations.

18. In a fixture as claimed in claim 17, said projection being resilient for yieldably engaging the carcass.

19. In a fixture as claimed in claim 18, said projection including a bendable tooth.

20. In a fixture as claimed in claim 19, said projection comprising a freely rotatable wheel, said bendable tooth comprising one of a series of circumferentially disposed, bendable teeth on the wheel.

21. In a fixture as claimed in claim 20, said wheel having at least a portion thereof disposed between a pair of arms of the fork.

22. In a fixture as claimed in claim 21, the spacing between the arms of the fork being no less than approximately twenty millimeters and the overall width of the fork adjacent the backrest being no greater than approximately forty millimeters.

23. In a fixture as claimed in claim 22, the spacing between the arms of the fork being approximately twenty-four millimeters.

24. In a fixture as claimed in claim 23, the overall width of the fork adjacent the backrest being no greater than approximately thirty-six millimeters.

25. In a fixture as claimed in claim 17, said fork including a pair of closely laterally spaced apart, outwardly projecting arms disposed symmetrically with respect to said center line and positioned to engage the carcass on opposite sides of the neck at the base thereof inside of its shoulders.

26. In a fixture as claimed in claim 25, the spacing between the arms of the fork being approximately 24 millimeters, said projection comprising a resilient, freely rotatable wheel having a plurality of circumferentially disposed, bendable teeth.

27. In a method for holding a poultry carcass in place during processing operations, the improvement comprising:

disposing the carcass in an inverted position with the shoulders and neck of the carcass facing downwardly;

holding the trunk of the inverted carcass immobilized in a centered position with respect to a generally upright center line;

placing the neck of the inverted carcass up against a backstop; and while the neck is against the backstop, engaging the carcass between the shoulders and base of the neck with a pair of centered, laterally spaced locating members so that the members on opposite sides of the neck bear against the inside of the shoulders to prevent significant side-to-side movement.

* * * * *